United States Patent
Barr

(10) Patent No.: US 6,300,868 B1
(45) Date of Patent: Oct. 9, 2001

(54) VEHICLE AUTOMATIC TRANSMISSION SAFETY SYSTEM

(76) Inventor: William A. Barr, P.O. Box 13, Gibson Island, MD (US) 21056-0013

(*) Notice: Subject to any disclaimer, the term of this patent is extended or adjusted under 35 U.S.C. 154(b) by 0 days.

(21) Appl. No.: 09/544,600

(22) Filed: Apr. 6, 2000

Related U.S. Application Data

(63) Continuation-in-part of application No. 09/298,939, filed on Apr. 26, 1999.

(51) Int. Cl.$^7$ ............................................. B60Q 1/00
(52) U.S. Cl. ............................ 340/457; 340/456; 340/438
(58) Field of Search ................................. 340/457, 456, 340/457.3, 438, 459; 200/61.88, 61.91

(56) References Cited

U.S. PATENT DOCUMENTS

| | | | |
|---|---|---|---|
| 3,381,269 | * 4/1968 | Fierbaugh et al. | 340/457 |
| 4,482,885 | * 11/1984 | Mochida | 340/457 |
| 4,495,484 | * 1/1985 | Kawakatsu et al. | 340/457 |
| 4,871,994 | * 10/1989 | Takeda et al. | 340/457 |
| 5,015,991 | 5/1991 | Barr | 340/456 |
| 5,581,233 | 12/1996 | Barr | 340/457 |
| 5,760,683 | 6/1998 | Barr | 340/457 |
| 5,926,088 | 7/1999 | Barr | 340/457 |

* cited by examiner

Primary Examiner—Daniel J. Wu
Assistant Examiner—Sihong Huang
(74) Attorney, Agent, or Firm—Oblon, Spivak, McClelland, Maier & Neustadt, P.C.

(57) ABSTRACT

A park system alarm is provided which is energized when operation of the park mechanism fails to open the park system switch, even though the shift lever is in the park position, and the driver initiates the process of opening his or her door. An external alarm is also energized through the park system switch and a seat switch if the driver leaves his normal driving position when the shift lever is not in park and when the shift lever is in park but the park system is broken or maladjusted. A put-in-park alarm is energized through the park system switch, a gear switch, and a door switch if the driver initiates the process of opening his or her door with the shift lever in any position except park. A seat switch circuit causes the parking pawl to engage the parking gear if the driver leaves the vehicle without placing the shift lever in park.

6 Claims, 13 Drawing Sheets

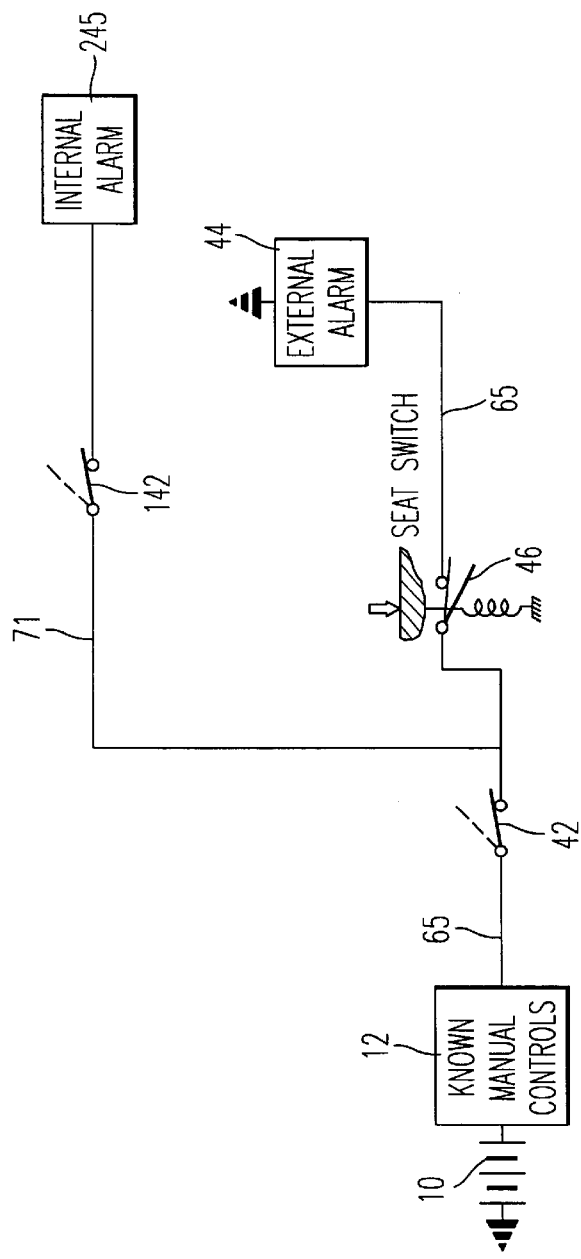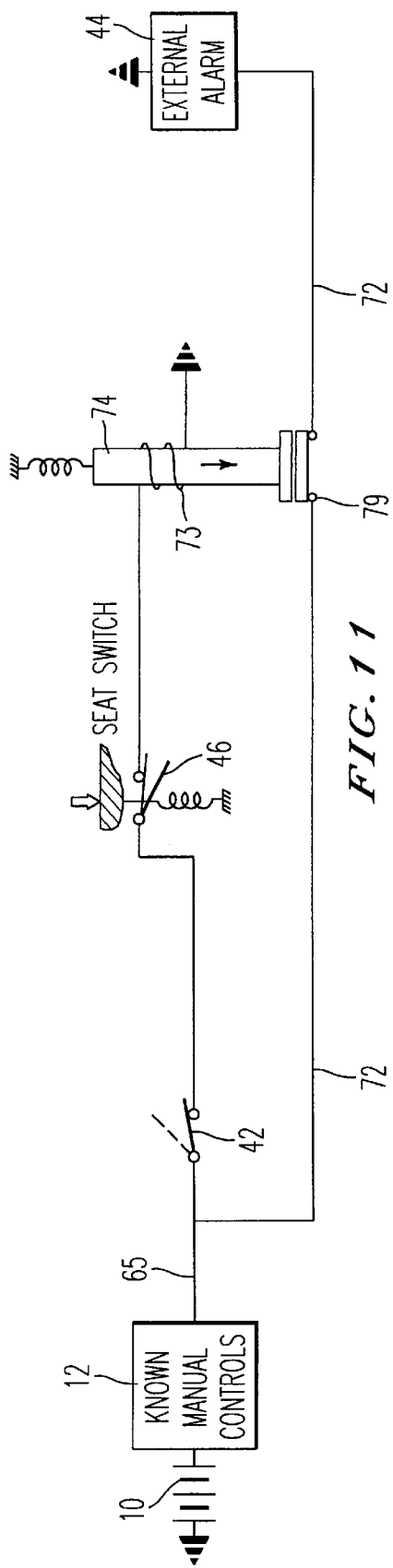
FIG. 10
FIG. 11

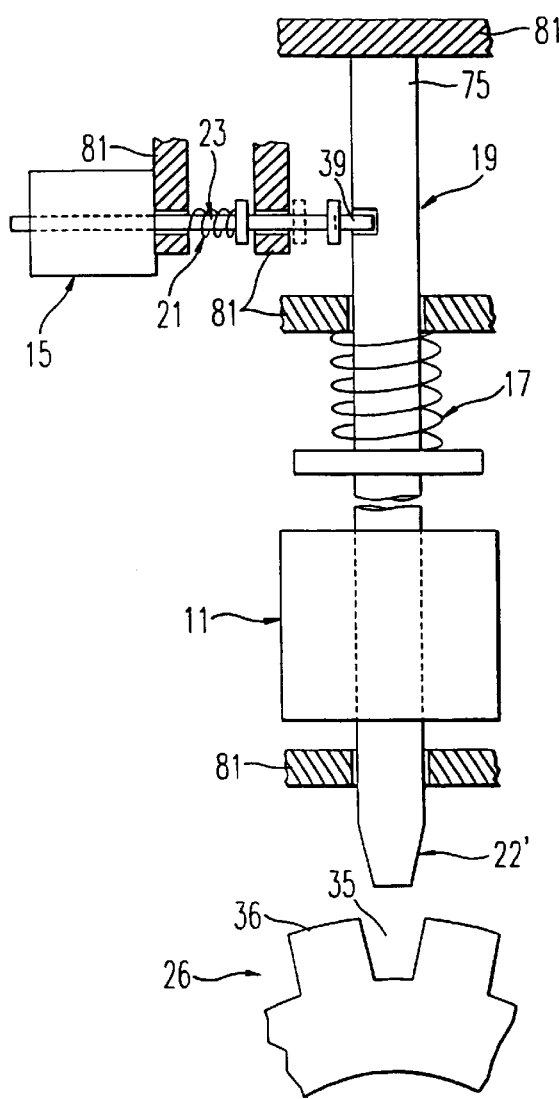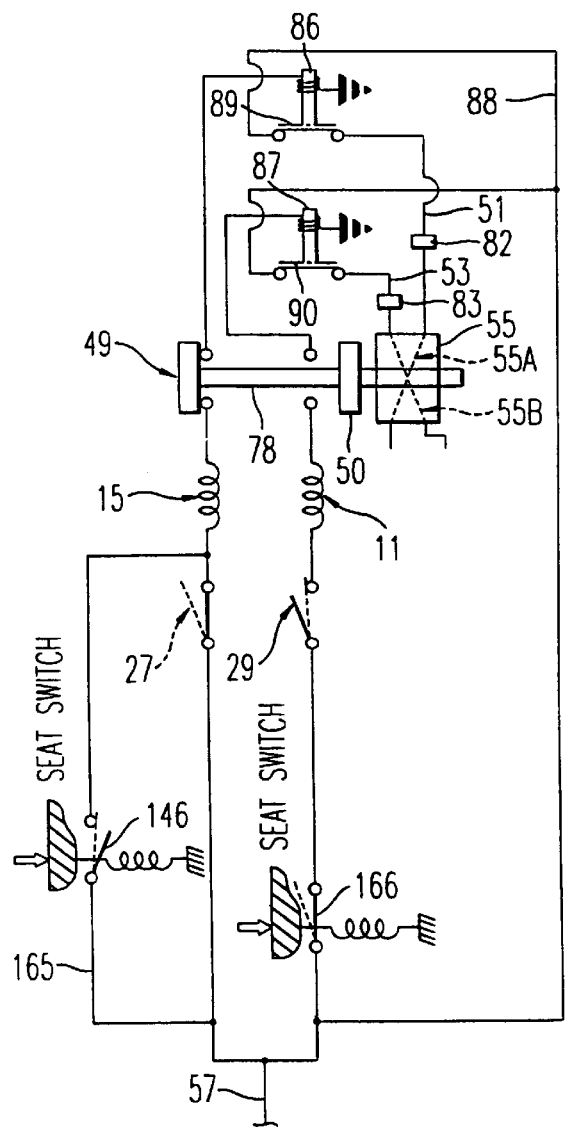
FIG. 20
FIG. 21

VEHICLE AUTOMATIC TRANSMISSION SAFETY SYSTEM

This application is a Continuation-in-part (CIP) of application Ser. No. 09/298,939, filed on Apr. 26, 1999.

BACKGROUND OF THE INVENTION

1. Field of the Invention

This invention relates to safety systems for automatic transmission vehicles and more particularly to a system whose primary function is to warn a driver when he has stopped his vehicle but failed to place the shift lever in park, where "park" means "latched park" so that the vehicle is properly restrained. The system includes subsidiary safety features which will become apparent as the description proceeds.

2. Background of the Invention

The patent to Mochida, U.S. Pat. No. 4,482,885, and applicant's own U.S. Pat. Nos. 5,015,991, 5,581,233, and 5,760,683 are representative of systems which sound an alarm when a driver prepares to leave a vehicle with the transmission selector lever not in park.

The prior art fails to assure that the vehicle park system linkage has moved the parking gear locking pawl into the latched position when the shift lever is in the park position. As us ed herein, the park system comprises three parts—the shift lever, the shift linkage, and the park mechanism. The shift linkage extends between the shift lever and the shaft which pass through the wall of the transmission. That shaft connects the shift linkage to the park mechanism. The park mechanism is inside the transmission. The prior art discloses use of a switch, located at the transmission end of the shift linkage, that is moved to the open position to prevent the activation of an alarm when the shift lever is in park and the shift linkage is apparently not broken or maladjusted. However, the prior art fails to teach or suggest locating such a switch in a position which completely assures that the locking pawl is in its latched position when that switch opens upon placing the shift lever in the park position. The present invention overcomes this deficiency in the prior art.

One object, therefore, of the invention is to provide a system for automatic transmission vehicles whose function is to sound alarms calling attention to the oversight of failing to place the shift lever in park or to the vehicle shift linkage and park mechanism derangement which results in the failure of the locking pawl to completely engage within the groove between a pair of teeth on the parking gear.

Another object of the invention is to provide an improved alarm system whose function is to sound alarms calling attention to the oversight of failing to place the shift lever in park or to vehicle shift linkage and park mechanism derangement which includes a normally closed park system switch which is opened by operation of a portion of the park mechanism, for example, the parking gear locking pawl or the end of the park apply rod as the locking pawl moves into its latched position when the shift lever is placed in park.

Another object is to provide a seat switch circuit that causes the locking pawl to engage the parking gear if the driver leaves his normal driving position without placing the shift lever in park.

SUMMARY OF THE INVENTION

The invention includes a park system alarm responsive to a broken or maladjusted park system which is energized when the shift lever is moved to park yet at least the distal end of the park mechanism and/or the locking pawl remains in its position which is not its normal park position so that the locking pawl does not engage between a pair of teeth in the parking gear.

The invention includes a second alarm (put-in-park alarm) to warn the driver of the vehicle if the driver is in the process of opening the driver's door with the shift lever in any position except park.

The invention further includes an external alarm to warn the public, as well as the driver, of the dangerous condition of the vehicle if the driver should leave his normal driving position with the vehicle shift lever in any position except park or with the shift lever in park if the locking pawl has not properly engaged the parking gear.

The invention further includes a seat switch circuit for causing the locking pawl to engage the parking gear if the driver leaves the vehicle without placing the shift lever in park.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein;

FIG. 10 is a modification of the circuit shown in FIG. 8, and it illustrates circuitry for energizing both an external alarm and one or more internal alarms;

FIG. 11 is another modification of the circuit illustrated in FIG. 8;

FIG. 20 illustrates a seventh embodiment of the invention.

FIG. 21 illustrates a modification of the circuit shown in FIG. 13.

DETAILED DESCRIPTION OF THE INVENTION

Figure 1:
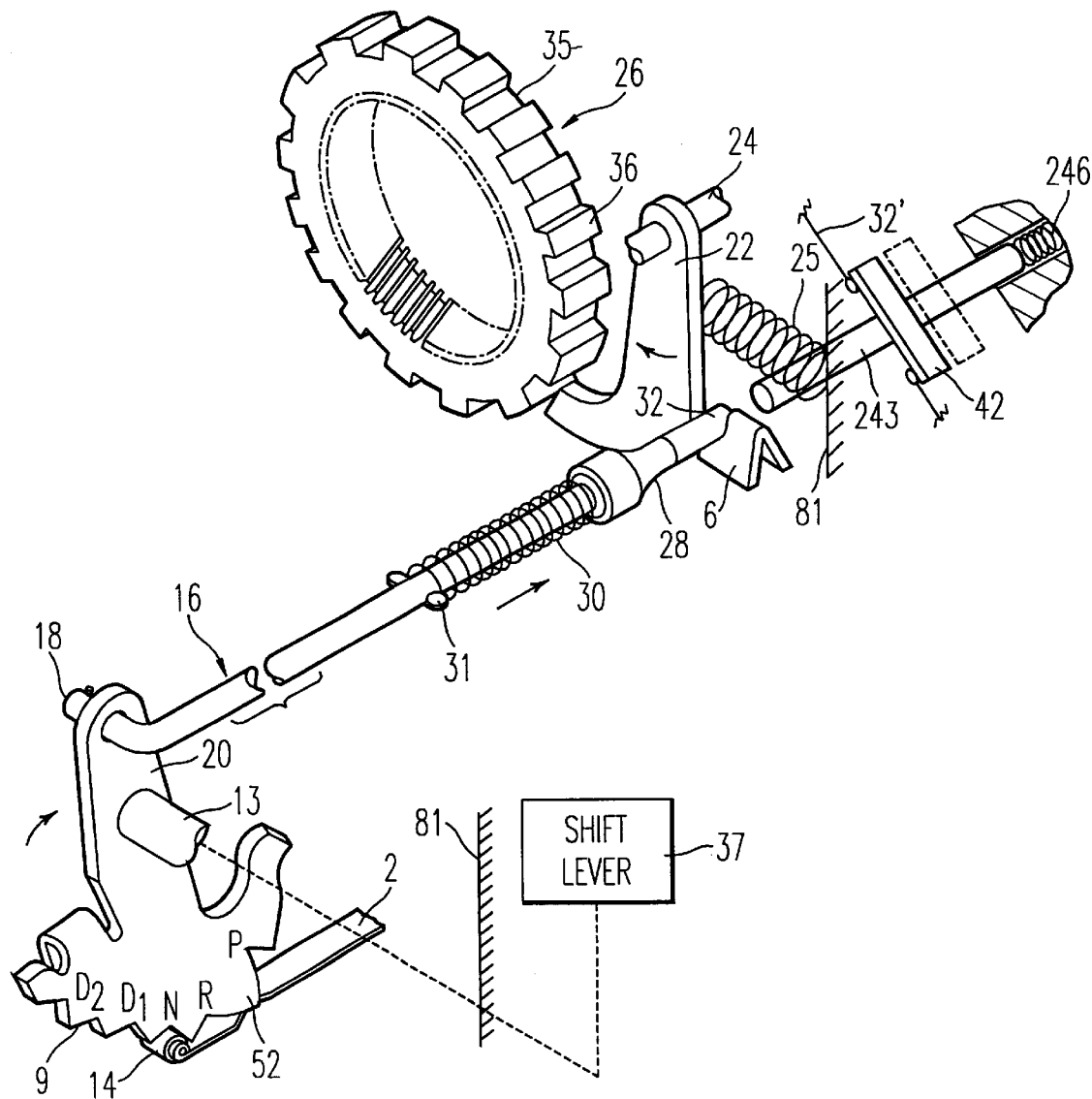
FIG. 1 illustrates the parking gear and the park mechanism within the transmission housing including a spring biased cam at the distal end of the park apply rod of the park mechanism controlling the actuation of the park system switch.

FIG. 1 illustrates a portion of a typical park mechanism of a vehicle equipped with an automatic transmission. The shaft 13 passes through a wall 81 of the transmission case. The shaft 13 rotates the rooster comb 20. The rooster comb has grooves 9 associated with the various positions of the shift lever, e.g., two drive positions ($D_2$, $D_1$), neutral (N), reverse (R), and park (P). Rotation of the shaft 13 clockwise by the shift lever causes the park apply arm 16 attached to the rooster comb 20 to move to the right or the left depending upon the direction of rotation of the shaft 13. The arm 16 includes a cam member 28 slidably mounted on the arm 16 and biased by the spring 30 to the right as illustrated in FIG. 1. The cam 28 engages the locking pawl 22 mounted on a shaft 24. The locking pawl is spring biased by the spring 25 away from the parking gear 26. The parking gear 26 has radially extending, circumferentially spaced teeth 36 formed thereon. Between each pair of teeth there is a groove 35. When the shift lever is in the park position, the arm 16 is urged to the right so that the cam 28 urges the locking pawl toward the parking gear 26. If the locking pawl engages the top of a tooth 36 when the shift lever is placed in the park position, spring 30 on the shaft 16 urges the cam 28 to the right, but since the locking pawl is not positioned to enter one of the grooves 35, the spring 30 compresses against the cam 28 until the parking gear moves slightly to align one of its grooves with the end of the locking pawl 22. At that point, the cam 28 moves to the right under the urging of the spring 30 and forces the locking pawl into one of the grooves 35. At that time, the distal end 32 of the cam member 28 opens normally closed park system switch 42. The shaft 243 on the switch 42 passes through a wall of the transmission in alignment with the end 32 of the cam member 28. The shaft 243 is biased by the spring 246 to urge the switch 42 toward the closed position.

Figure 2:
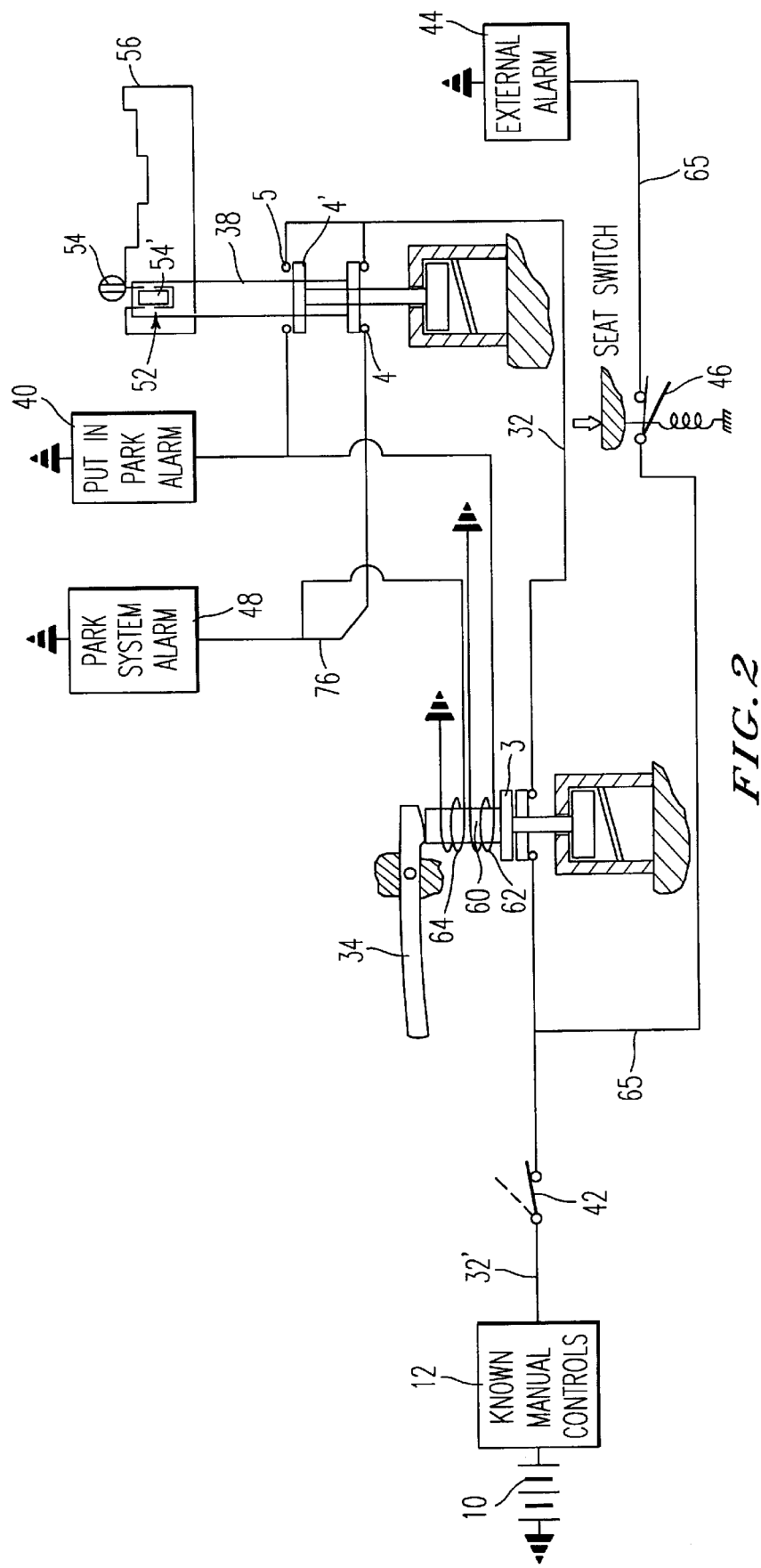
FIG. 2 illustrates a first embodiment of the invention.

FIG. 2 illustrates a first embodiment of the invention. The numeral 10 designates a source of power and 12 designates manual controls which may be substantially the same as those shown in FIG. 1 of applicant's prior U.S. Pat. No. 5,015,991. The invention is utilized in conjunction with a conventional shift lever moveable between a latched park position and any one of a number of other positions except park. Conventional shift linkage elements extending from the shift lever to the shaft 13 rotates the shaft 13 as the shift lever is moved to the various shift positions.

The first embodiment of the invention includes the park system switch 42 connected through the circuit 65 to the external alarm 44 through intervening normally closed seat switch 46. The numeral 3 illustrates a normally open switch 3 which closes during the process of opening the driver's side door. As illustrated in FIG. 2, the switch 3 may be closed by operating the door handle 34 in the opening direction. The numeral 48 designates a park system alarm. The park system alarm is connected by the circuit elements 76 and 32 through an intervening park switch 4 to the door switch 3. The numeral 40 designates a put-in-park alarm that is connected with the switch 3 through an intervening gear switch 5 that is in parallel with the park switch 4. The gear switch 5 is closed whenever the shift lever is in any position except park and the park switch 4 is closed only when the switch lever is in the park position.

The tang 54 on the shift lever is biased by a spring against the contact surface of the insert plate 56 normally associated with the shift lever whether the shift lever is mounted on the steering column or on the floor of the vehicle. Generally speaking, the tang 54 may be any spring loaded component or part of the shift lever which is latched in the park slot 52 of the insert plate, as illustrated in FIG. 2, when the shift lever is in park.

The conventionally spring-loaded bridge carrying member 38 is in the upward position in all shift lever positions other than park and is moved into the downward position as the tang 54 enters park slot 52 when the gear shift lever is in park (shown as 54'). In the upward position, bridge 4' serves switch 5. When the shift lever is moved to park, the tang 54 is lowered by a spring (not shown) which forces the tang against the contact surface of the park slot 52 of the insert plate 56, thereby lowering bridge carrying member 38. Bridge 4' thus opens switch 5 and is moved to the lower position shown in FIG. 2 to close switch 4 for reasons which will become clear as the description proceeds.

The put-in-park alarm 40 is connected to the source of power through the switches 5, 3, and 42. Switches 5 and 42 are closed when the shift lever is in any position except park. Therefore, when the switch 3 is closed during the driver's side door opening process, the put-in-park alarm will be energized if the shift lever is in any position except park. The put-in-park alarm thereby warns the driver to place the shift lever in the park position before exiting the vehicle. The coil 62 maintains the switch 3 closed, even though the door handle 34 is released, until the driver places the shift lever in the park position thereby opening switch 5.

The external alarm 44 is connected to the source of power through the seat switch 46 and the park system switch 42. Thus, when the driver leaves his normal driving position without placing the shift lever in the park position, the seat switch 46 closes thereby energizing the external alarm to warn members of the public, as well as the driver, that the vehicle is in an unsafe condition.

The park system alarm 48 is connected to the source of power through the switches 4, 3, and 42. Thus, as pointed out above with respect to FIG. 1, the switch 42 is closed except when the shift lever is in the park position and the cam member 28 of the park mechanism has moved the locking pawl 22 into one of the grooves 35 thereby assuring that the vehicle is in a safely parked condition. When the locking pawl 22 engages one of the grooves 35 in the parking gear 36, the switch 42 opens thereby interrupting current flow to the switches 3, 4, and 46. Thus, with the switch 42 open, the park system alarm will not be energized when the switch 3 is closed during the door opening process. Likewise, with the switch 42 open, the external alarm will not be energized upon closing of the switch 46 when the driver leaves his normal driving position.

On the other hand, even though the shift lever is in the park position, if the cam 28 at the end of the park mechanism has not forced the locking pawl into one of the grooves 35, the switch 42 will remain closed. With the shift lever in the park position, the switch 4 is closed. Therefore, upon closing the switch 3 during the opening process of the driver's side door, the park system alarm 48 will be energized. The coil 64 around the armature 60 on the switch 3 will maintain the switch 3 closed even though the handle 34 is released. With the switch 42 closed, the external alarm 44 will be energized upon closure of the switch 46 when the driver leaves his normal driving position. The park system alarm 48 and the external alarm 44 will warn the driver to place a wheel of the vehicle against the curb or otherwise safely secure the vehicle. The park system alarm 48 and the external alarm 44 can then be de-energized by operating the known manual controls 12 or by disconnecting the source of power 10. Once the park system is repaired and the cam 28 again forces the locking pawl 22 into a groove 35 in the locking gear 36, the park system switch 42 will be opened so that the source of power may be reconnected without energizing the alarms.

Figure 3:
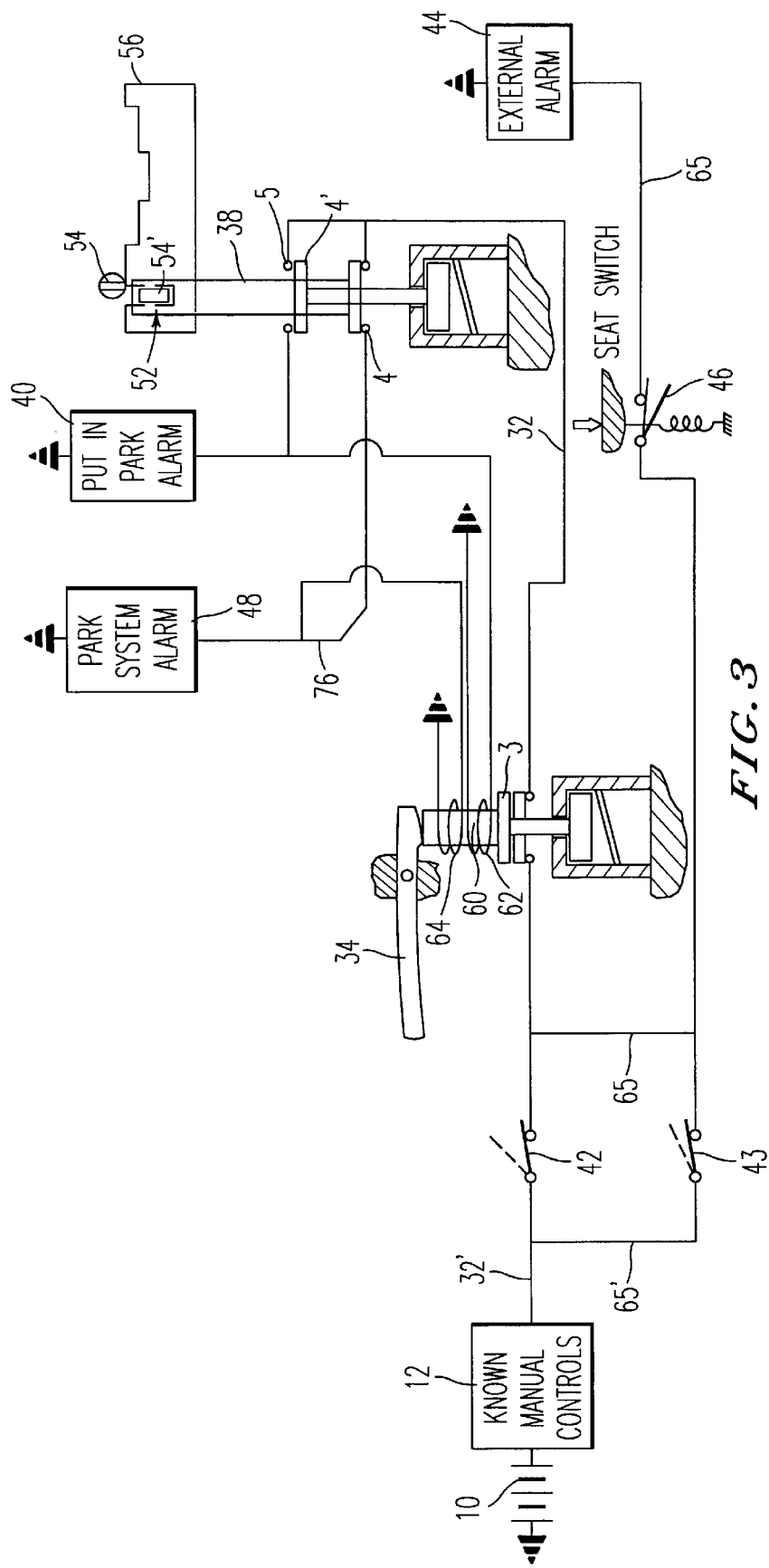
FIG. 3 illustrates a second embodiment of the invention.

FIG. 3 modifies the circuit of FIG. 2 in that circuit 65 is connected to the circuit element 32' by switch 43 and circuit element 65' between the switch 42 and the known manual controls 12. Switch 43 is closed when the shift lever is in any position except park or when the shift lever is in park and the park system is broken or maladjusted. The switch 43 is in parallel with switch 42 and can also be positioned to be opened by the distal end of the park mechanism (or the locking pawl) upon engagement of the locking pawl in a groove between a pair of teeth on the locking gear when the shift lever is in the park position. The circuit of FIG. 3 provides a redundant feature in that the external alarm 44 will be energized if the driver leaves his seat when the shift lever is not in park or when the shift lever is in park and there is a broken or maladjusted park system even though the switch 42 is defective and is not closed under either or both of those conditions.

Figure 4:
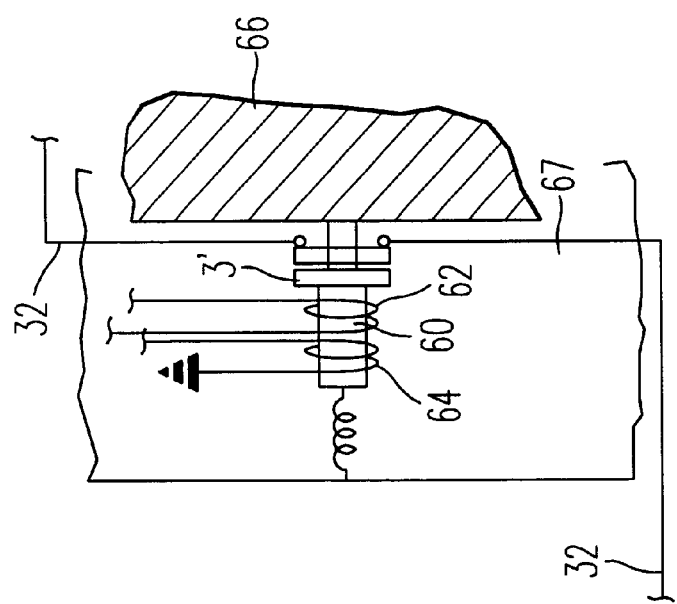
FIG. 4 illustrates a modification of the closing mechanism for the door switch shown in FIGS. 2–4 which closes during the door opening process.

FIG. 4 illustrates a switch 3' which can be substituted for the switch 3 illustrated in FIGS. 2–3. Instead of using a handle 34 to close switch 3 as illustrated in FIGS. 2–3, the switch 3' is mounted in the doorjamb 67 and is held open by the closed door 66. During the door opening process of door 66, the switch 3' closes. The coils 62 and 64 serve to maintain the switch 3' closed under the conditions described above with respect to switch 3 in the circuits of FIGS. 2 and 3.

Figure 5:
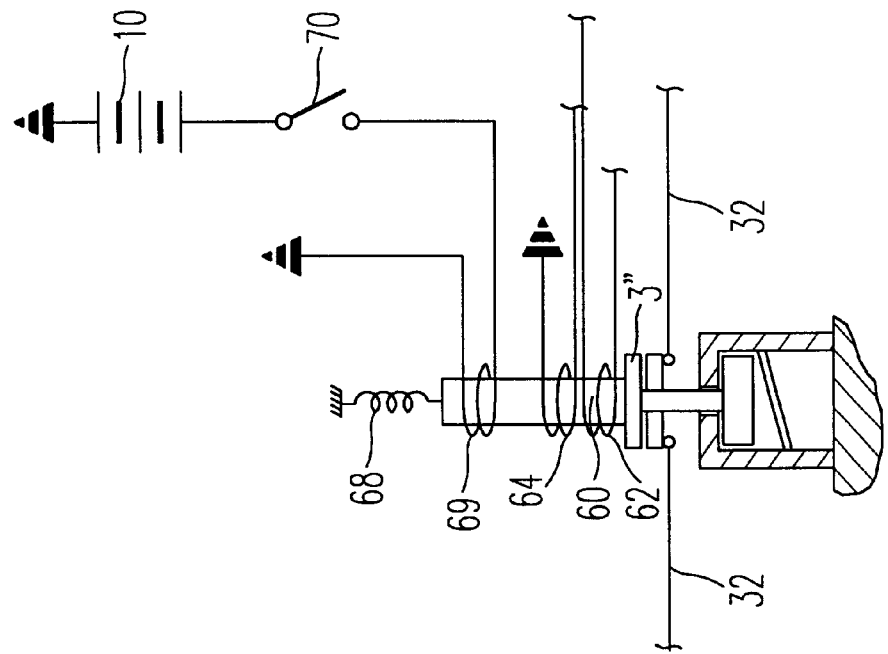
FIG. 5 is another modification of the closing mechanism for the switch referred to in FIG. 4.

FIG. 5 illustrates a switch 3" which is adapted to be closed by coil 69 during the door opening process by the action of the driver closing switch 70. The coil 69 moves the armature 60 to close the switch 3".The coils 62 and 64 serve to maintain the switch 3" closed in the manner described above with respect to switch 3 in FIGS. 2 and 3. The spring 68 biases the switch 3" toward the open position.

Figure 6:
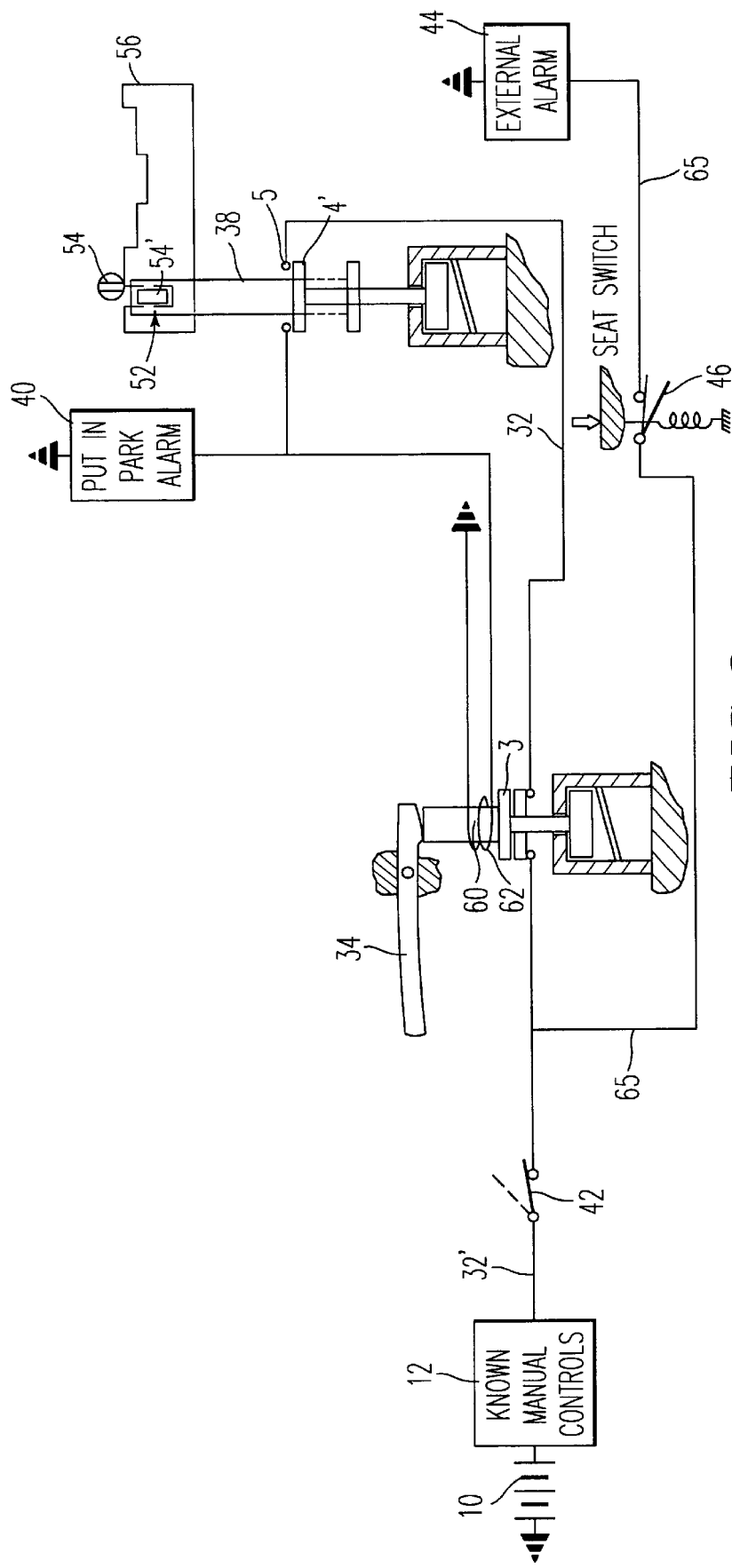
FIG. 6 illustrates a third embodiment of the invention.

FIG. 6 corresponds to the structure illustrated in FIG. 2 except that the FIG. 6 embodiment eliminates the park system alarm 48 and the circuit elements 76 and 64 illustrated in FIG. 2. The structure of FIG. 6 includes the put-in-park alarm 40 and the external alarm 44. Therefore, the arrangement illustrated in FIG. 6 relies on the external alarm 44 to perform a dual function of warning both the driver and the public of a broken or maladjusted park system. That is, when the shift lever is not in park or the shift lever is in park but there is a broken or maladjusted park system, the switch 42 remains closed and the external alarm is energized by closure of the seat switch 46 if the driver leaves his normal driving position.

Figure 7:
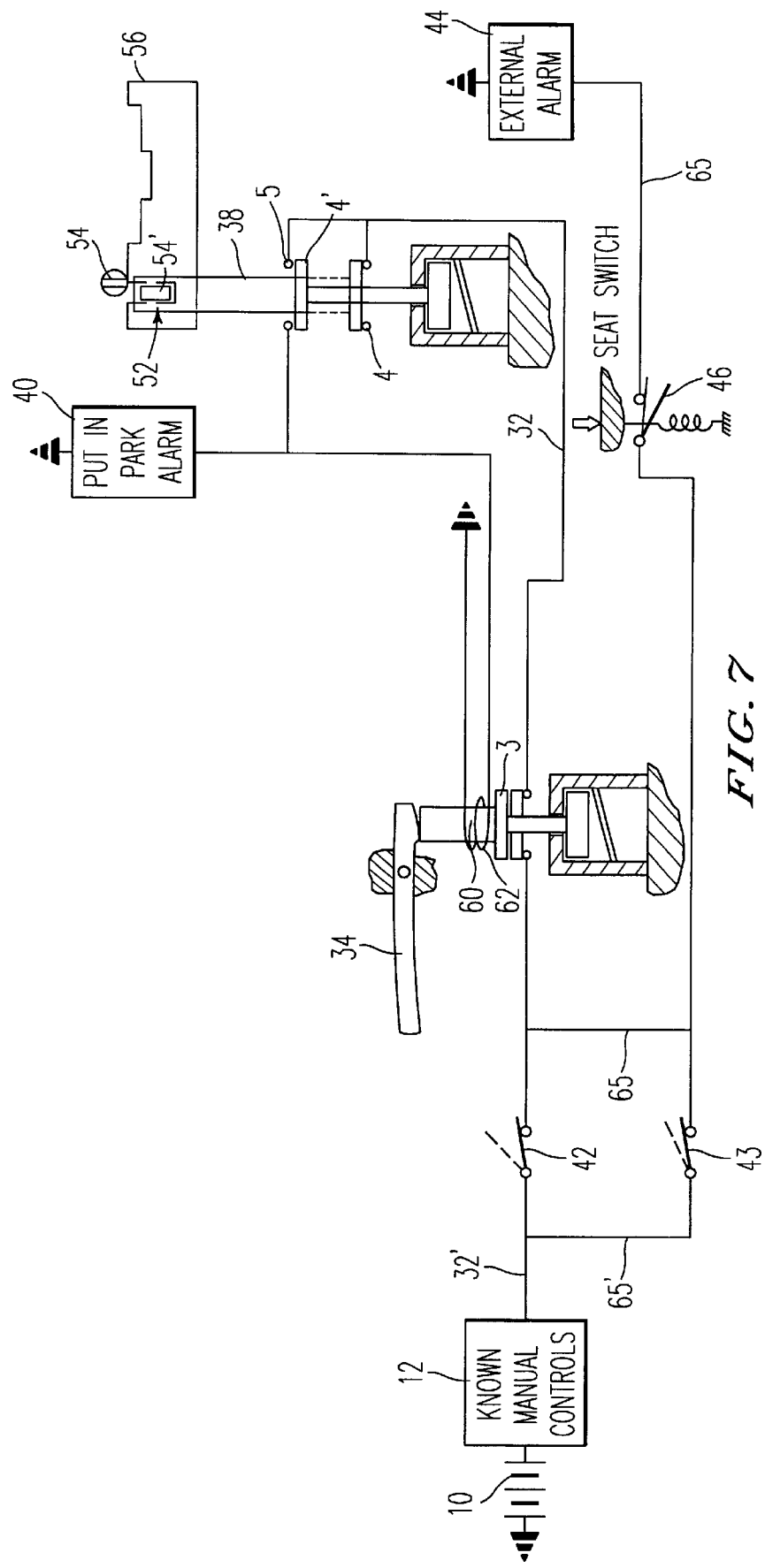
FIG. 7 illustrates a modification of the circuitry illustrated in FIG. 6.

The arrangement shown in FIG. 7 is the same as that illustrated in FIG. 6, except that it includes an additional switch 43. Switch 43 is redundant with respect to switch 42. That is, like switch 42, switch 43 is open when the shift lever is in the park position and the park system is not broken or maladjusted. However, if the shift lever is not in park or if the shift lever is in park but the park system is broken or maladjusted, the switch 43 remains closed. Thus, in the event that the switch 42 is in its open position even though the shift lever is in the park position and there is a broken or maladjusted park system, the external alarm 44 would be energized through the switch 43 and the seat switch 46 if the driver leaves his normal driving position. Again, the switch 43 can be positioned to be opened by the end of the park apply rod of the park mechanism adjacent to the locking pawl (or by the locking pawl) upon engagement of the locking pawl in a groove between a pair of teeth on the locking gear when the shift lever is in the park position. On the other hand, if the shift lever was in any position except park during the opening process of the driver's side door, the put-in-park alarm 40 would be energized through the switch 43, switch 3, and switch 5.

Figure 8:
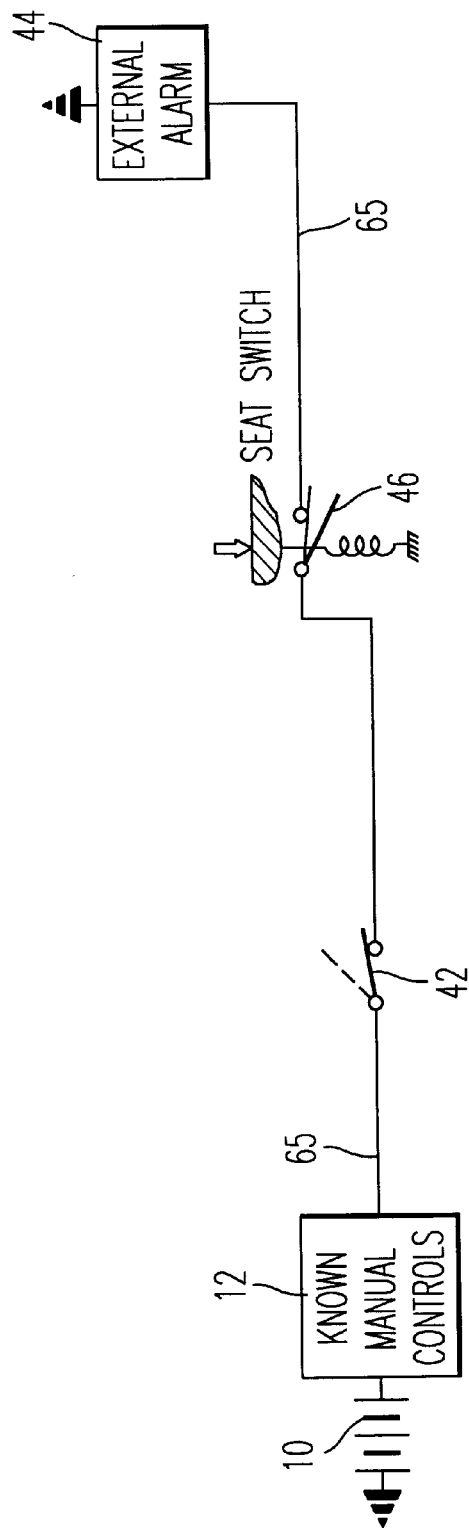
FIG. 8 illustrates a circuit for energizing an external alarm.

FIG. 8 eliminates the put-in-park alarm illustrated in FIGS. 6 and 7. Switch 42 is open when the shift lever is in the park position and the park system is functioning normally. However, switch 42 is closed when the shift lever is not in the park position or when the shift lever is in the park position but the park mechanism fails to open the switch 42. Accordingly, under either of those conditions, the external alarm 44 would be energized by closure of the seat switch 46 when the driver leaves his normal driving position. Thus, by the use of only two switches in the circuit shown in FIG. 8, both the driver and the public can be warned that the vehicle is in an unsafe condition when the driver leaves his normal driving position—i.e., either the shift lever is not in park or there is a broken or maladjusted park system so that the locking pawl is not engaged with the parking gear.

Figure 9:
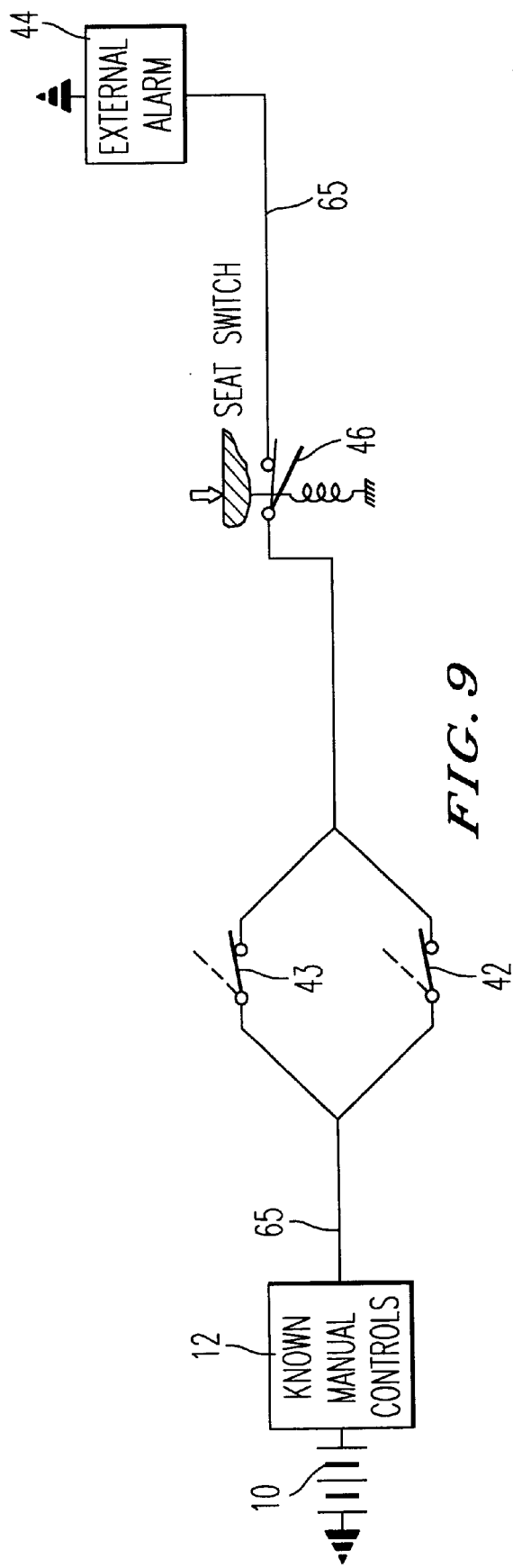
FIG. 9 is a modification of the circuit illustrated in FIG. 8.

FIG. 9 provides redundancy for the circuit illustrated in FIG. 8 in that it provides a second switch 43 which is closed when the shift lever is not in the park position or when the shift lever is in the park position but there is a broken or maladjusted park system. Thus, if the switch 42 malfunctions and is in its open position even though the shift lever is not in the park position or the shift lever is in the park position but there is a broken or maladjusted park system, the circuit to the external alarm 44 would be completed through the switch 43 and the seat switch 46 if the driver leaves his normal driving position. The switch 43 can be positioned to be opened by the park mechanism upon engagement of the locking pawl in a groove between a pair of teeth in the locking gear.

FIG. 10 is a modification of the circuit illustrated in FIG. 8. FIG. 10 adds circuit element 71, switch 142, and an interior alarm or alarms 245. Switch 142 is open when the driver's door is closed. During the driver's side door opening operation, the switch 142 closes. Thus, if the shift lever is not in the park position or the shift lever is in the park position but there is a broken or maladjusted park system, the switch 42 will remain closed and the interior alarm or alarms 245 will be energized through switch 142 during the process of opening the driver's side door. Under that condition, if the driver leaves his normal driving position, the external alarm 44 would be energized through the seat switch 46. The switch 142 can be a switch of the type illustrated at 3' in FIG. 4. As shown in FIG. 4, the switch 3' is spring-biased towards the closed position and is held open by the closed door 66.

FIG. 11 is a modification of the circuit shown in FIG. 8. This embodiment includes a relay comprising the solenoid 74 spring biased toward a position where switch 79 in circuit 72 is open and coil 73 for moving the solenoid 74 to close switch 79. In this embodiment, when the switches 42 and 46 are closed, the solenoid 74 is activated through coil 73 to close switch 79 in circuit 72 and thereby energize the external alarm 44. The switch 42 and the seat switch 46 are closed in the manner described above with respect to FIG. 8. Those skilled in the art will readily appreciate that a relay and associated circuitry of the type shown in FIG. 11 could be used in any of the circuits shown in FIGS. 1–10 to energize the various alarms disclosed herein.

The switches 42 and 43 illustrated in FIGS. 2, 3, 6, 7, 8, 9, 10, and 11 may also be spring or otherwise biased toward their closed position and moved to their open position by any suitable mechanical, electrical, pneumatic, or other connection between the switch or switches and a properly functioning park system.

Figure 12:
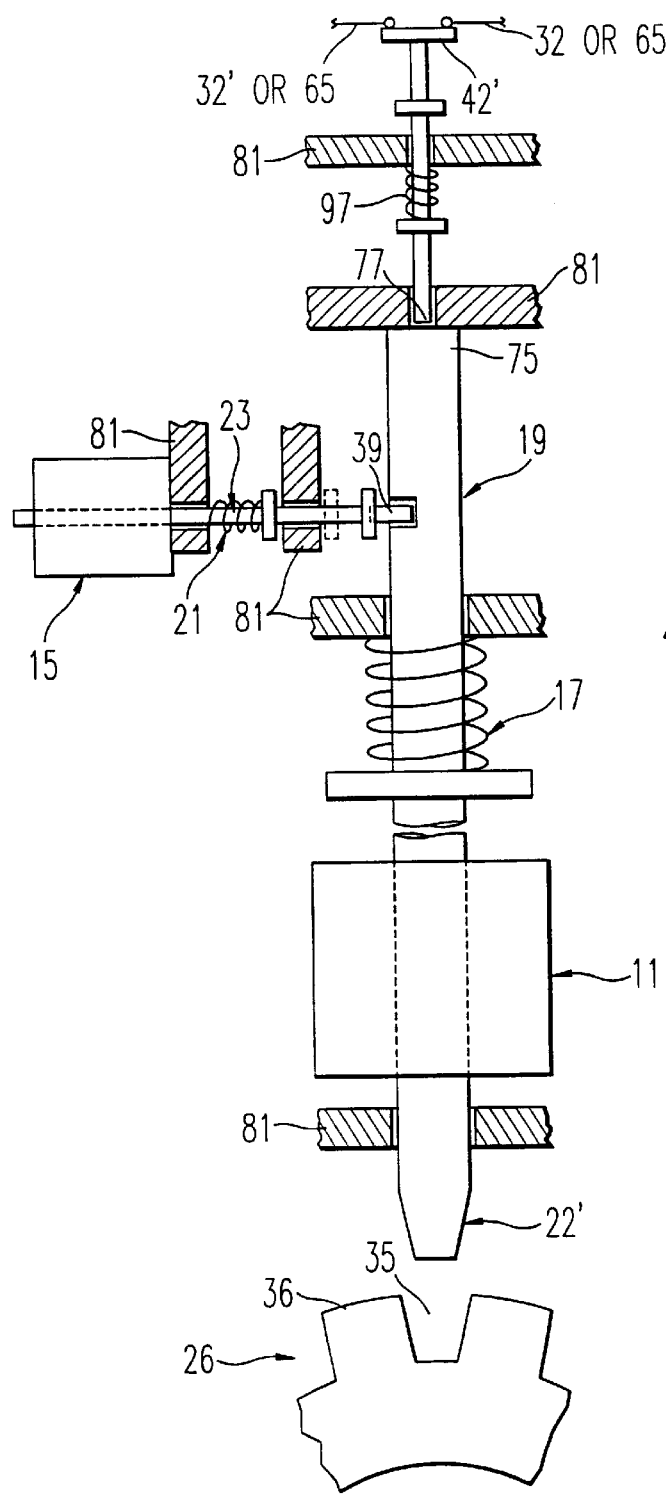
FIG. 12 illustrates a fourth embodiment of the invention.

FIG. 12 illustrates another embodiment of the invention wherein the locking pawl 22' is biased into engagement with the parking gear 26 by the spring 17 when the shift lever is in park. When the shift lever is moved out of the park position, the solenoid 11 moves the rod 19 to its latched position thereby retracting the locking pawl 22' from engagement with the parking gear 26. The locking pawl 22' is formed as one piece with the rod 19 or otherwise integrally connected thereto. The rod 19 and its locking pawl 22' are held in the latched position by the rod 23. The rod 19 is non-rotatably mounted in the housing 81 so that the notch 39 remains aligned with the rod 23 and the pawl 22' properly mates with the grooves 35 in the locking gear 26. That is, the rod 19 and openings in the housing are shaped to permit the rod 19 to reciprocate longitudinally but to preclude rotation thereof by making the rod 19 and the openings in the housing with a square or other non-round cross-section. Longitudinal ribs on the rod 19 and cooperating grooves in the edges of the openings in the housing 81 or vice versa could be used for example. The rod 23 is biased toward its extended position by the spring 21 into the notch (locking recess) 39 in rod 19 to retain the rod 19 in its latched position. The end 75 of the rod 19 engages the end of the shaft 77 of the park system switch 42' to close the switch 42' when the locking pawl 22' is in its retracted position. When the locking pawl 22' is engaged with the parking gear 26, the spring 97 biases the park system switch 42' into its open position. When the shift lever is moved into park, the solenoid 15 is activated to move the rod 23 to its retracted position where it is free from engagement in the notch 39 in the rod 19. Upon retraction of the rod 23, the rod 19 and its locking pawl 22' are biased toward their released position by the spring 17. If one of the teeth 36 of the locking gear 26 is in line with the locking pawl 22' when the rod 19 is released, the spring 17 will continue to bias the rod 19 toward the parking gear 26 so that upon slight movement of the parking gear the lock pawl 22' will be biased into one of the grooves 35 between a pair of teeth 36. If the locking pawl 22' does not engage the parking gear when the shift lever is in park, the park system switch 42' will remain closed. The switch 42' can be used in place of the switch 42 in any of the circuits shown in FIGS. 2, 3, and 6–11. The switch 43 shown in FIGS. 3, 7, and 9 could be opened or closed in the same manner as the switch 42' shown in FIG. 12.

Figure 13:
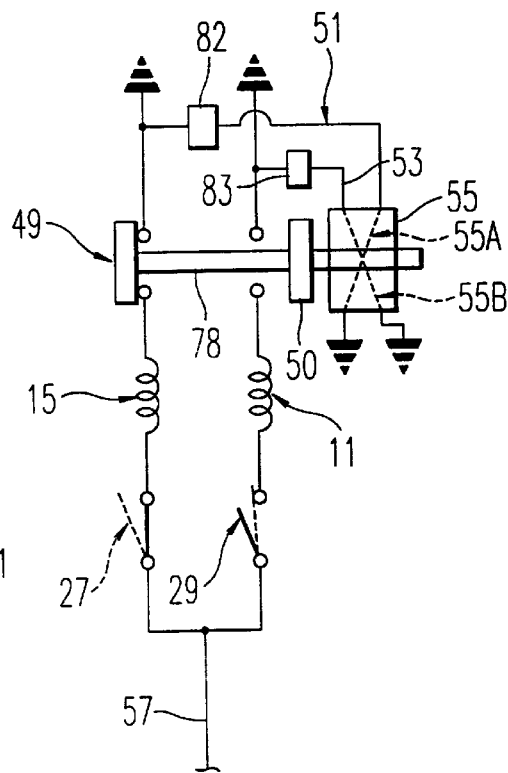
FIG. 13 illustrates circuitry for controlling the operation of the device shown in FIG. 12.

FIG. 13 illustrates the circuitry for actuating the solenoids 11 and 15. Circuit element 57 is connected to a source of power such as the source of power 10 illustrated in FIG. 1. When the shift lever is dropped into the park position, the tang 54 on the shift lever closes the switch 27 connected with the solenoid 15. The solenoid 15 is connected through the switch 49 to ground to complete the circuit. Thus, when the switches 27 and 49 are closed, the solenoid 15 retracts the rod 23 from the notch 39 in the rod 19 to thereby release the rod 19 and locking pawl 22' for engagement with the parking gear 26. Circuit element 51 connects, preferably through a time delay device 82, the switch 49 with coil 55A of the relay 55. The relay 55 is a double acting unit adapted to move the rod (armature) 78 in one direction to open the switch 49 and close the switch 50 and to move the rod 78 in the opposite direction to close the switch 49 and open the switch 50. When current flows through the switch 27, the solenoid 15, and the switch 49, the circuit element 51 completes a circuit through coil 55A of the relay 55 to move the rod 78 to the right to open the switch 49 and close the switch 50.

The conventional time delay device 82 in the line 51 is used to assure that the bar 23 is not released from its retracted position by the solenoid 15 for a few seconds so that the bar 19 has time to move downward a distance at least sufficient to preclude the rod 23 from entering the notch 39 when the solenoid 15 is deactivated. The time delay device 83 is used to assure that the rod 19 is completely retracted before the solenoid 11 is deactivated. The time delay devices 82 and 83 could be conventional devices such as those used to cause the intermittent operation of windshield wipers. A suitable delay would be about 3–5 seconds.

When the shift lever is moved out of the park position, the tang on the shift lever closes the switch 29. The relay 55 opened the switch 49 and closed the switch 50 when the shift lever was moved into the park position. With the switch 29 closed and the switch 50 closed, a circuit is completed through the solenoid 11 to thereby move the rod 19 to the latched position. Upon retracting the rod 19, the rod 23 is biased into the notch 39 to maintain the rod 19 in the latched position. In its latched position, the rod 19 engages the shaft 77 on the switch 42' and thereby closes the switch 42'. The circuit element 53 connects, preferably through a time delay device 83, the switch 29, the solenoid 11, and the switch 50 to the coil 55B of the relay 55. When current flows through switch 29, solenoid 11, and switch 50, the relay 55 moves the rod 78 to the left to open switch 50 and close switch 49. The circuit will then be set to activate the solenoid 15 the next time the shift lever is moved into the park position. The switches 27 and 29 are biased to their normally open position. The tang on the shift lever closes the switch 27 when the shift lever is placed in park. When the shift lever is moved out of park, the switch 27 returns to its open position and the switch 29 is closed by the tang on the shift lever. Alternatively, the switch 27 and 29 could be actuated in the same manner as the switches 4 and 5 illustrated in FIGS. 2, 3, 6, and 7. That is, the switch 27 could be normally open and the switch 29 could be normally closed with the tang on the shift lever opening switch 29 and closing switch 27 when the shift lever is placed in park. Furthermore, the switch 29 could be closed by brake fluid pressure, by operation of the ignition, or by hand.

Figure 14:
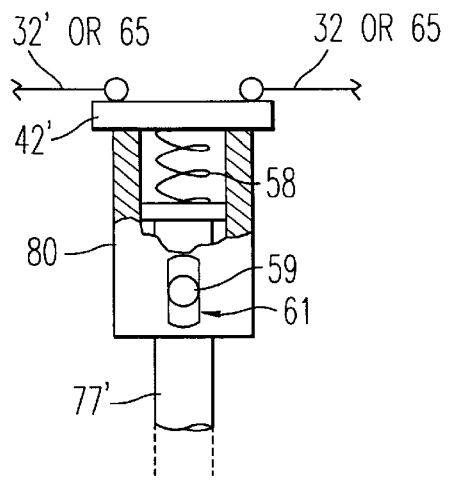
FIG. 14 illustrates a lost motion connection between the park system switch and the shaft used to move the switch to the open or closed position.

FIG. 14 illustrates a park system switch 42' which is connected to the shaft 77' through a lost motion connection which allows for less accurate tolerances in the length of the retractable rod 19 and the shaft 77'. The switch 42' includes a hollow shaft 80 that surrounds the shaft 77'. The shaft 77' has a pin 59 adapted to slide in a slot 61 in the hollow shaft. A spring 58 within the hollow shaft biases the hollow shaft and the shaft 77' away from each other. When the shaft 77' is not in engagement with the rod 19, the spring 58 biases the rod 77' to a position where the pin 59 engages the bottom of the slot 61. When the rod 19 is retracted, the upper end 75 thereof moves the shaft 77' upwardly to close the switch 42". Part of the movement of the shaft 77' can be absorbed by the spring 58 as the pin 59 moves upwardly within the slot 61.

Figure 15:
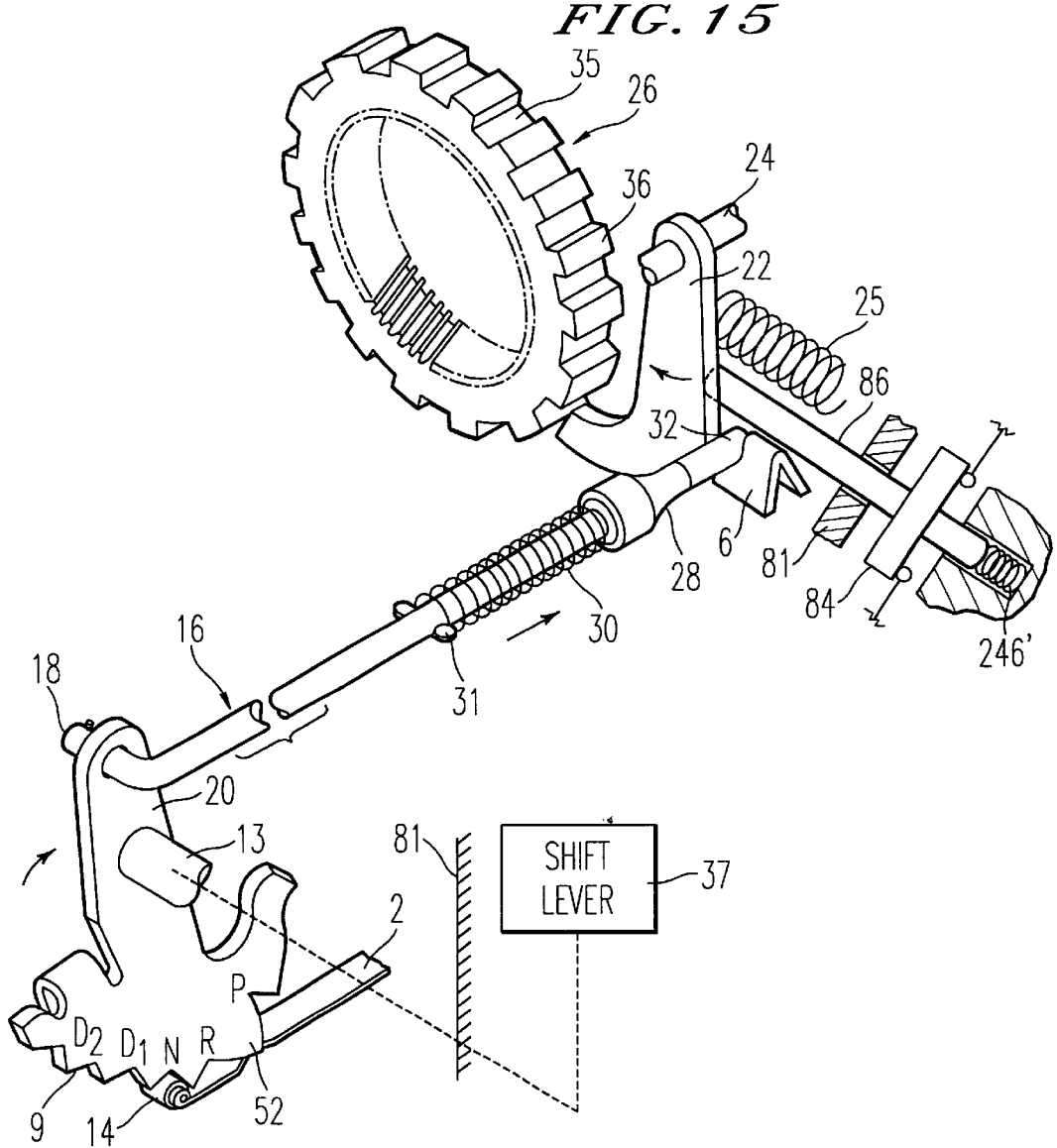
FIG. 15 illustrates a fifth embodiment of the invention.

FIG. 15 illustrates a modification of the structure illustrated in FIG. 1. In FIG. 15, the locking pawl 22 controls the operation of the park system switch 84. As long as the locking pawl 22 is held out of engagement with the locking gear 26 by the return spring 25, the park system switch 84 is maintained closed by the force of the locking pawl applied to the shaft 86 on the park system switch 84. When the shift lever is in the park position and the park system is not broken or maladjusted, the cam 28 force the locking pawl 22 into one of the grooves 35 in the parking gear 26. Movement of the locking pawl 22 into one of the grooves 35 permits the park system switch 84 to open under the bias of spring 246'. Spring 25 is stronger than spring 246' so that the force of the spring 25 on the locking pawl overcomes the force of the spring 246' and maintains the park system switch closed when the shift lever is in any position except park. On the other hand, when the shift lever is placed in the park position, entry of the locking pawl 22 into one of the grooves 35 in the locking gear assures that the vehicle is safely parked when the park system switch 84 opens.

Figure 16:
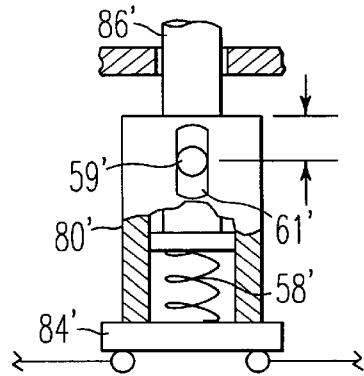
FIG. 16 illustrates a lost motion connection like that shown in FIG. 14.

FIG. 16 illustrates a park system switch 84' provided with a lost motion connection with the shaft 86' which allows for less accurate tolerances in the length of the shaft 86'. The lost motion connection comprises the slot 61' in the hollow shaft 86', a pin 59' connecting the shaft 86' with the hollow shaft 86', and a spring 58' to bias the shaft 86' and hollow shaft 80' against each other. When no force is applied to the shaft 86', the pin 61' is biased into engagement with the top of the slot 61' by the spring 58'. On the other hand, when sufficient force is applied to the shaft 86' in the direction to close the switch 84', the pin 59' is moved toward the bottom of the slot 61' against the compression of the spring 58'.

Figure 17:
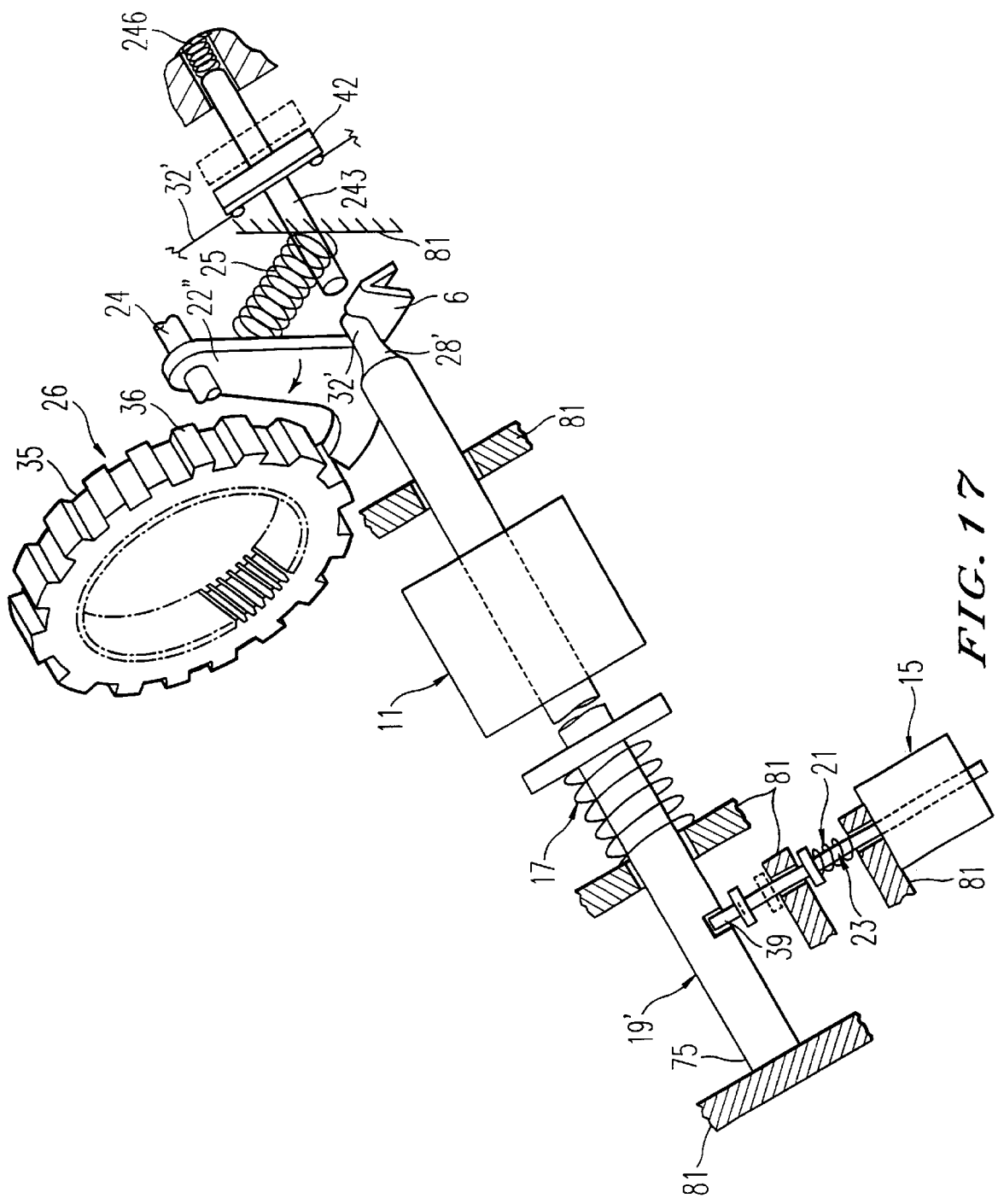
FIG. 17 illustrates a sixth embodiment of the invention.

FIG. 17 illustrates an embodiment combining features of the embodiments shown in FIGS. 1 and 12. Instead of having the pawl 22' mounted on the end of the shaft 19 as illustrated in FIG. 12, the shaft 19' is provided with a cam 28' like that shown at 28 in FIG. 1 to actuate the pawl 22" like the pawl 22 shown in FIG. 1. When the shaft 19' is released by operation of the solenoid 15, the end 32' of the shaft 19' opens the switch 42 when the cam 28' moves locking pawl 22" into a groove 35 in the parking gear 26.

Figure 18:
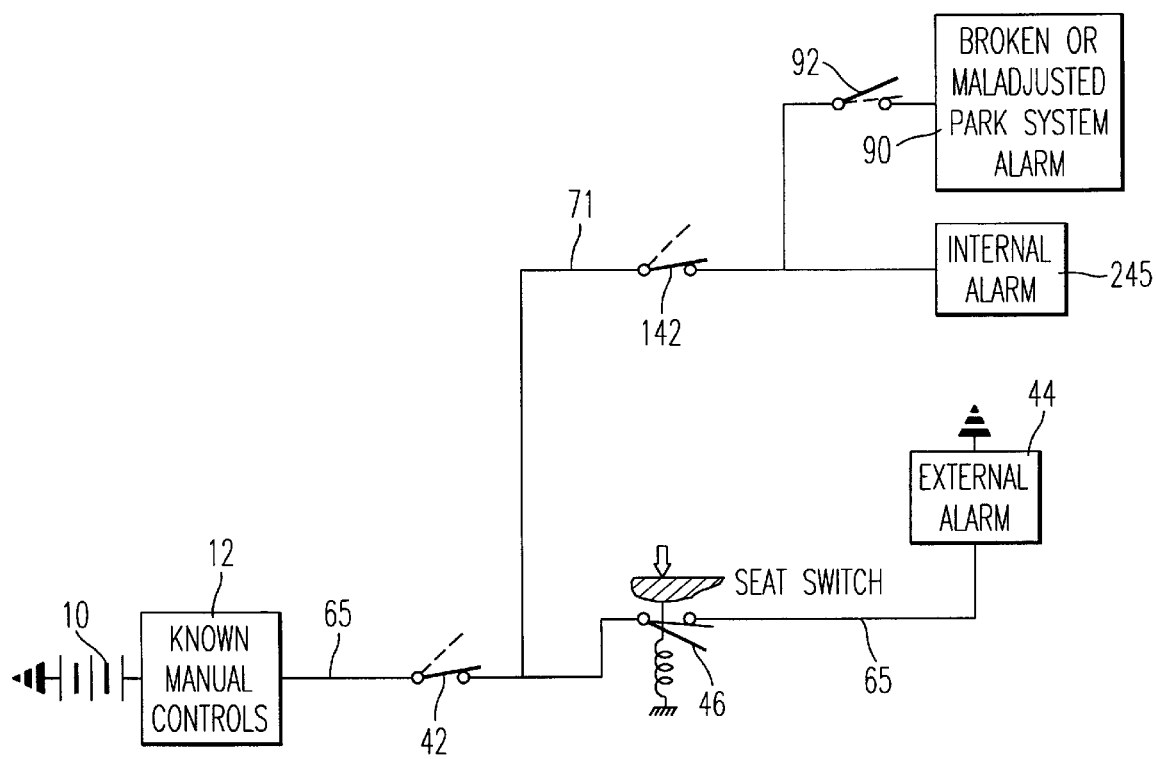
FIG. 18 illustrates a modification of the circuit shown in FIG. 10.

FIG. 18 illustrates a modification of the circuit illustrated in FIG. 10. FIG. 18 adds to FIG. 10 a broken or maladjusted park system alarm 90. The broken or maladjusted park system alarm 90 is connected with the door switch 142 through a normally open switch 92. The switch 92 is closed when the shift lever is placed in the park slot in the insert plate 56 illustrated in FIG. 2. Thus, when there is a broken or maladjusted park system, the alarm 90 is energized when the shift lever is in the park position and the driver is in the process of opening the driver's side door to thereby close switch 142.

Figure 19:
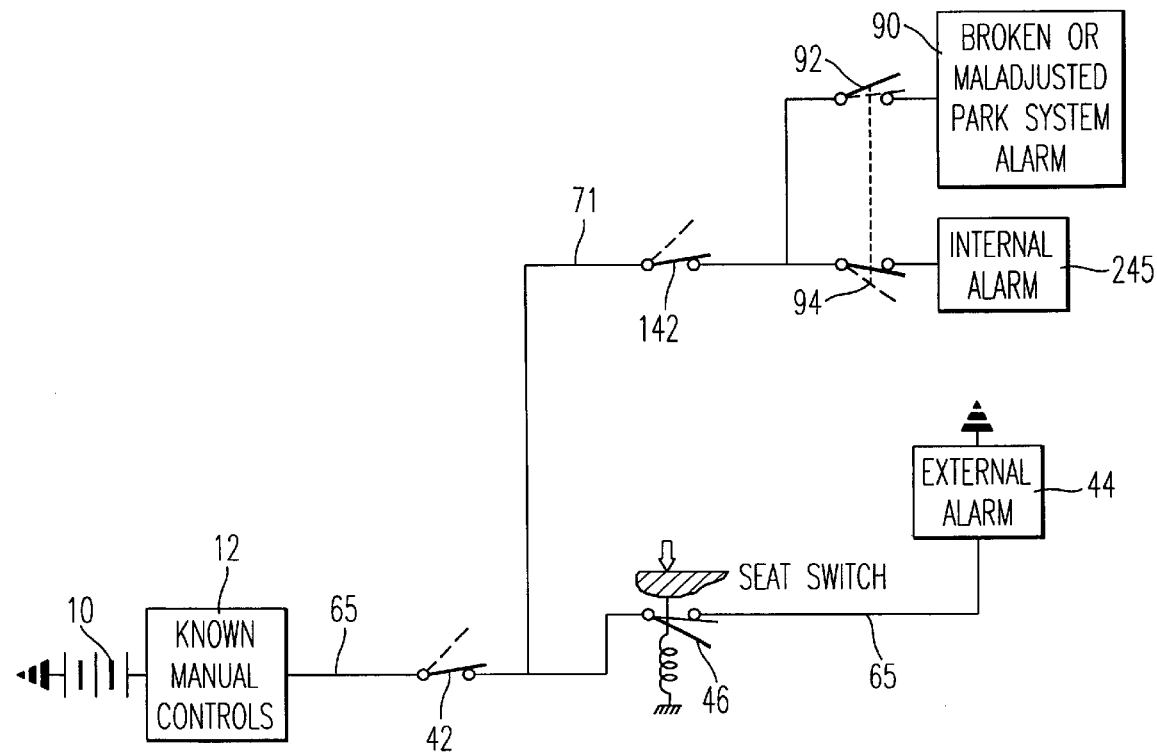
FIG. 19 illustrates modification of the circuit shown in FIG. 18.

FIG. 19 is a modification of the circuit shown in FIG. 18. FIG. 19 illustrates a normally closed switch 94 between the internal alarm 245 and the door switch 142. The normally closed switch 94 is associated with the shift lever and the switch 92 such that when the switch 92 closes, the switch 94 opens. Therefore, when the shift lever is in the park position and there is a broken or maladjusted park system, the alarm 90 is energized but the alarm 245 is not energized when the driver is in the process of opening the driver's side door. Of course, a single switch could be used in place of the two switches 92 and 94. That is, the same switch element that normally closes the circuit to alarm 245 could close the circuit to alarm 90 when it is moved to open the circuit to alarm 245.

The embodiment illustrated in FIG. 20 corresponds to the structure illustrated in FIG. 12 insofar as the operation of the locking pawl 22' is concerned. However, the embodiment illustrated in FIG. 20 eliminates the park system switch 42', along with its associated shaft 77 and spring 97.

FIG. 21 is a modification of the circuit illustrated in FIG. 13. In FIG. 21, a normally closed seat switch 146 is connected by the circuit element 165 to the source of power through circuit element 57 and the solenoid 15 in parallel with the switch 27. The seat switch 146 is biased to its open position by the driver's weight. The switches 27 and 29 illustrated in FIG. 21 may be operated by the shift lever as described with respect to the embodiment illustrated in FIGS. 12 and 13. That is, when the shift lever is in the park position switch 27 is closed by the tang 54 on the shift lever as described with respect to FIG. 13. When the switches 27 and 49 are closed the solenoid 15 retracts the rod 23 from the notch 39 in the rod 19 to thereby release the rod 19 and locking pawl 22' for engagement with the parking gear 26. In the embodiment illustrated in FIGS. 20 and 21, if the driver leaves his normal driving position without placing the shift lever in park, the seat switch 146 will close and thereby complete a circuit from the source of power connected to circuit element 57 through the circuit element 165, solenoid 15, switch 49, and relay 86 to retract the rod 23 from the notch 39 and to thereby release the rod 19 and locking pawl 22' for engagement with the parking gear 26. The circuit element 88 is connected to the source of power 57. When relay switch 89 closes, a circuit is completed from circuit element 88 through switch 89, circuit element 51, time delay 82, and coil 55A to move the rod (armature) 78 to open switch 49 and close switch 50. The switch 89 is maintained closed by relay 86 until the time delay 82 (3–5 seconds) expires. At the end of the time delay, the rod 78 is moved by coil 55A to open switch 49 and close switch 50. When switch 49 opens, the circuit to relay 86 is broken allowing switch 89 to return to its normally open position. Thus, the seat switch 146 provides an economical device for ensuring that the locking pawl is engaged with the parking gear when the driver leaves the vehicle. When the shift lever is used to close the switch 29, it closes the switch 29 in any position except park. Therefore, a normally open seat switch 166 is used to open the circuit from the source of power 57 to the switch 29 when the driver leaves his normal driving position. When the driver returns to his normal driving position, the seat switch 146 opens and the seat switch 166 closes. That action will complete a circuit from the source of power 57 through seat switch 166, switch 29, coil 11, switch 50, and relay 87 to retract the locking pawl 22'. On the other hand, the switch 29 may be closed by brake fluid pressure, by the ignition, or by hand in which cases, the seat switch 166 may be omitted, if desired. The relay 87 will close relay switch 90 to complete a circuit from the source of power 57 through circuit element 88, circuit element 53, time delay 83 (3–5 seconds), and relay coil 55B of relay 55. The switch 90 is maintained closed by relay 87 until the time delay expires. At the end of the time delay, the rod 78 is moved by coil 55B to open switch 50 and close switch 49. When switch 50 opens, the circuit to relay 87 is broken allowing switch 90 to return to its normally open position. In the embodiment illustrated in FIGS. 20 and 21 no alarms are used. However, the seat switch circuits illustrated in FIG. 21 could also be used in the alarm system illustrated in FIGS. 12 and 13 if desired.

A cause of serious accidents is accidental movement of a vehicle due to a broken or maladjusted park system which can be especially dangerous because the shift lever has already been moved with accustomed ease into park, though the park system has failed to move the locking pawl into the latched position. In the present invention, that condition is accurately and assuredly sensed, when the driver begins to leave the vehicle, and results in energization of the park system alarm 48 to warn the driver that a serious problem exists and that he or she must immediately apply the parking brakes or otherwise immobilize the vehicle such as by placing a tire against the curb.

A put-in-park alarm 40 warns the driver if be or she begins to leave the vehicle without placing the shift lever in park.

An external alarm warns the public that the vehicle is not in a safe park condition. It may be used alone or in combination with one or both of the other alarms.

A seat switch circuit causes the locking pawl to engage the locking gear if the driver leaves his normal driving position without placing the shift lever in park.

Obviously, numerous modifications and variations of the present invention are possible in light of the above teachings. It is therefore to be understood that the invention may be practiced otherwise than as specifically described herein.

What is claimed as a new and is desired to be secured by Letters Patent of the United States is:

1. A vehicle automatic transmission safety system comprising:
    a first member for moving a locking pawl into engagement with a groove between teeth on a parking gear, said first member having a latching recess therein, said first member having a latched position wherein said locking pawl is free of engagement with said parking gear and a released position wherein said locking pawl is in engagement with a groove between teeth on said parking gear;
    a second member having an extended position adapted to releaseably engage the latching recess in said first member to maintain said first member in its latched position, said second member having a retracted position allowing said first member to move to its released position;
    a first solenoid for moving said second member to its retracted position thereby freeing said first member for movement into its released position wherein said locking pawl engages a groove between teeth on said parking gear;
    a first switch connected to a source of power and to said first solenoid, said first switch being closed by placing a shift lever in park whereby, when said shift lever is placed in park, said first solenoid is actuated to retract said second member to allow said first member to move said locking pawl into engagement in a groove in said parking gear; and
    a normally closed first seat switch being moved to the open position by the driver's weight connected with said source of power and said first solenoid in parallel with said first switch, whereby said first solenoid is actuated by said seat switch to retract said second member thereby releasing said first member to move said locking pawl into engagement in a groove between teeth on said parking gear if the driver leaves his normal driving position without first placing the shift lever in park.

2. A vehicle automatic transmission safety system according to claim 1, comprising:
    a second solenoid for moving said first member to its latched position;
    a second switch being connected to said second solenoid, said second switch being closed by moving said shift lever out of park; and
    a normally open second seat switch connected to said second switch and said second solenoid, and second seat switch being closed by the driver's weight when the driver is in his normal driving position whereby when said shift lever is moved out of park and the driver is in his normal driving position the second solenoid is actuated to move said first member to its latched position thereby disengaging said locking pawl from said parking gear.

3. A vehicle automatic transmission safety system according to claim 2, comprising:
    a relay including an armature carrying a first element and a second element;
    a third switch connected to said first solenoid;
    a fourth switch connected to said second solenoid; and
    wherein said first element on said armature closes said third switch and said second element on said armature opens said fourth switch when said armature is in a first position and said second element on said armature closes said fourth switch and said first element on said armature opens said third switch when said armature is in a second position whereby when said first switch or said first seat switch and said third switch are closed said first solenoid is actuated and when said second switch, second seat switch, and said fourth switch are closed said second solenoid is actuated.

4. A vehicle automatic transmission safety system according to claim 3, further comprising:
    a first coil and a second coil on said relay;
    a first time delay device connecting said third switch with said first coil to open said third switch and close said fourth switch a predetermined time after the closing of said first switch or said first seat switch to allow time for the first member to move from its latched position towards its second position a sufficient distance to preclude said second member from entering the latching recess on the first member when the first solenoid is deactivated; and
    a second time delay device connecting said fourth switch with said second coil to open said fourth switch and close said third switch a predetermined time after both said second switch and the second seat switch are closed to allow time for the second solenoid to retract the first member into its latched position before the second solenoid is deactivated.

5. A vehicle automatic transmission safety system according to claim 1, wherein said locking pawl is integrally connected to said first member.

6. A vehicle automatic transmission safety system according to claim 1, wherein said first member includes a cam for moving said locking pawl into engagement with a groove in said parking gear.

\* \* \* \* \*